(12) United States Patent
Powers

(10) Patent No.: US 8,662,520 B1
(45) Date of Patent: Mar. 4, 2014

(54) HITCH ADAPTER

(71) Applicant: Michael Cornelius Powers, Carrollton, TX (US)

(72) Inventor: Michael Cornelius Powers, Carrollton, TX (US)

( * ) Notice: Subject to any disclaimer, the term of this patent is extended or adjusted under 35 U.S.C. 154(b) by 0 days.

(21) Appl. No.: 13/748,558

(22) Filed: Jan. 23, 2013

Related U.S. Application Data

(60) Provisional application No. 61/590,729, filed on Jan. 25, 2012.

(51) Int. Cl.
*B60D 1/07* (2006.01)

(52) U.S. Cl.
USPC ............ 280/416.1; 280/415.1; 280/511; 280/456.1; 280/504; 280/495; 280/477; 280/452; 280/457

(58) Field of Classification Search
USPC ........ 280/511, 415.1, 416.1, 456.1, 504, 495, 280/477, 452, 457
See application file for complete search history.

(56) References Cited

U.S. PATENT DOCUMENTS

| | | | | |
|---|---|---|---|---|
| 3,837,674 A * | 9/1974 | Rathsack | ................ | 280/416.3 |
| 3,963,266 A * | 6/1976 | Thelin | ................ | 280/504 |
| 4,379,569 A * | 4/1983 | Koch | ................ | 280/416.1 |
| 5,161,815 A * | 11/1992 | Penor, Jr. | ................ | 280/477 |
| 5,211,416 A * | 5/1993 | Blacklaw | ................ | 280/416.1 |
| 5,433,467 A * | 7/1995 | Easterwood | ................ | 280/507 |
| 5,503,422 A * | 4/1996 | Austin | ................ | 280/477 |
| 7,669,878 B1 * | 3/2010 | Williams, Jr. | ................ | 280/507 |
| 8,333,402 B2 * | 12/2012 | Moore, Jr. | ................ | 280/477 |

* cited by examiner

*Primary Examiner* — Joseph M Rocca
*Assistant Examiner* — Marlon Arce
(74) *Attorney, Agent, or Firm* — Plager Schack LLP

(57) ABSTRACT

An improved hitch adapter allows an individual to attach a vehicle with a hook to a trailer with a ball coupler. The improved hitch adapter comprises an adapter ring mechanically coupled to a front plate. The front plate is mechanically coupled to a first parallel surface. The first parallel surface further comprises an adapter ball inset. The first parallel surface is mechanically coupled to a left plate and a right plate. The adapter ball inset is mechanically coupled to a height-adjustable ball. The right plate and the left plate are mechanically coupled to a size variable clamp. This enables a user to mechanically couple the hook to ball coupler regardless of size of the ball coupler enabling full articulation in a vertical direction and a rotational direction.

3 Claims, 3 Drawing Sheets

HITCH ADAPTER

CROSS REFERENCE TO RELATED APPLICATIONS

This application claims priority to U.S. Provisional Application 61/590,729 filed on Jan. 25, 2012.

FIELD OF THE INVENTION

This invention relates to automotive accessories.

BACKGROUND OF THE INVENTION

As used in this application articulation means full horizontal and rotational movement until a trailer contacts a vehicle.

Prior to the disclosed embodiments of the invention, trailers using ball-style couplers did not have enough articulation when used in an off-road or construction type environment. This limits the effectiveness and usefulness of ball-style couplers. The prior art includes, U.S. Patent Application 2010/0207357 filed by Hathcock; U.S. Pat. No. 5,211,416 issued to Blacklaw; and U.S. Pat. No. 4,844,498 issued to Kerins. One difference between these prior art references and the disclosed embodiments of the invention is the lack of adaptability as a result of the omission of a size variable clamp and height-adjustable ball.

Hathcock and Blacklaw use a lunette ring coupler bracket, but do not use the size variable clamp in embodiments of the present invention. Accordingly, Hathcock and Blacklaw are more limited in that they can only accommodate one size of ball coupler. Kerins uses a latch over a trailer hitch that performs a limited version of the function of the lunette ring and, again, is limited in size. To contrast, the size variable clamp and height-adjustable ball allows embodiments of the present invention to fit a wide variety of trailer ball couplers. Hathcock and Blacklaw require modification to the ball coupler for use, but embodiments of the present invention do not. Finally, the construction of embodiments of the present invention allows full articulation in all directions as opposed to one direction only with a ball coupler. Hathcock loses articulation in the ball hook.

BRIEF SUMMARY OF THE INVENTION

An improved hitch adapter allows an individual to attach a vehicle with a hook to a trailer with a ball coupler. The improved hitch adapter comprises an adapter ring mechanically coupled to a front plate. The front plate is mechanically coupled to a first parallel surface. The first parallel surface further comprises an adapter ball inset. The first parallel surface is mechanically coupled to a left plate and a right plate. The adapter ball inset is mechanically coupled to a height-adjustable ball. The right plate and the left plate are mechanically coupled to a size variable clamp. This enables a user to mechanically couple the hook to ball coupler regardless of size of the ball coupler enabling full articulation in a vertical direction and a rotational direction.

BRIEF DESCRIPTION OF THE SEVERAL VIEWS OF THE DRAWINGS

Figure 1:
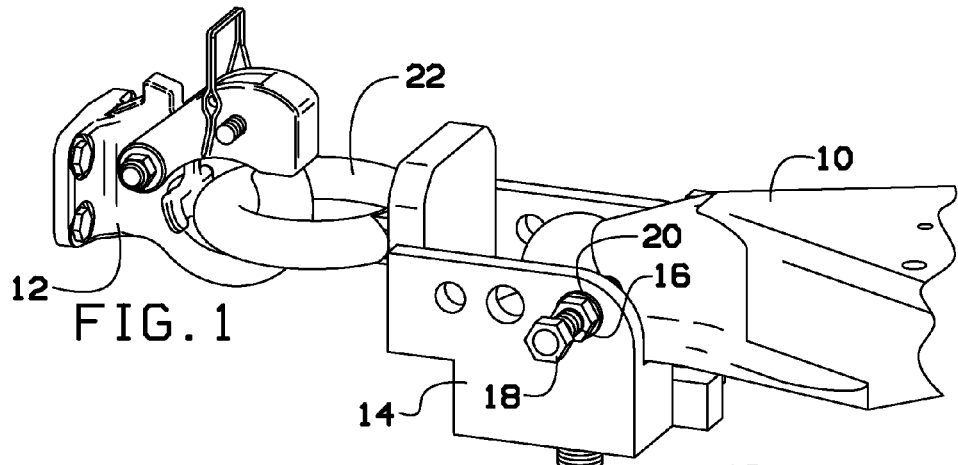

Having thus described the invention in general terms, reference will now be made to the accompanying drawings, which are not necessarily drawn to scale, and wherein:

FIG. 1 is a detail perspective view of one embodiment of the invention shown in use.

Figure 2:
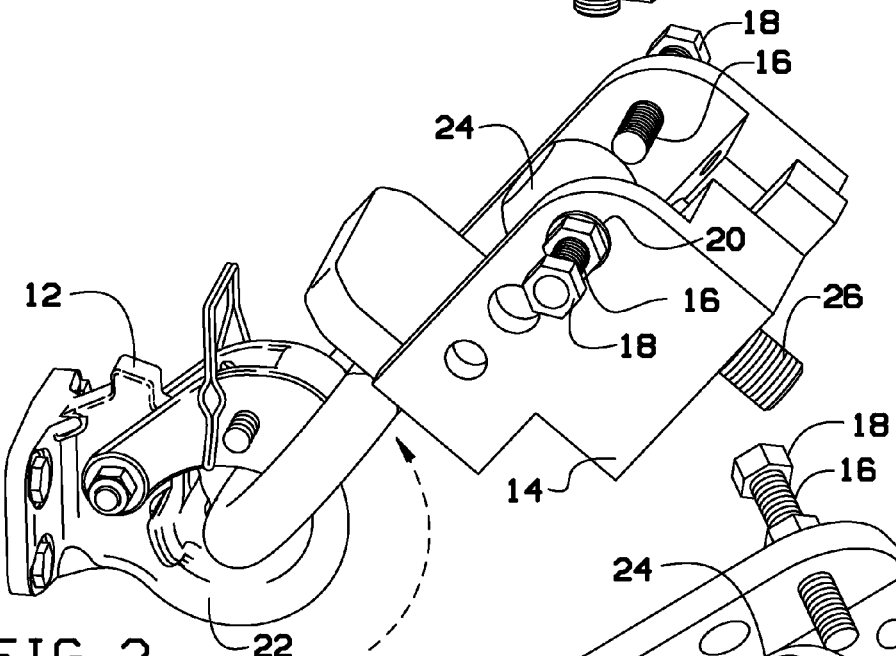

FIG. 2 is a side perspective view of one embodiment the invention shown in use, shown without item the ball coupler for illustrative clarity and demonstrating vertical rotational motion of an embodiment of the invention.

Figure 3:
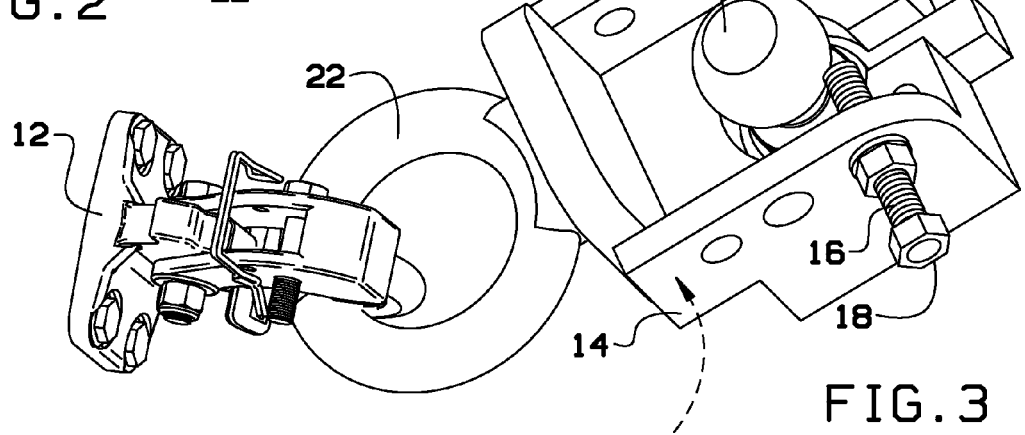

FIG. 3 is a side perspective view of one embodiment of the invention shown in use, shown without item the ball coupler for illustrative clarity and demonstrating lateral rotational motion of an embodiment of the invention.

Figure 4:
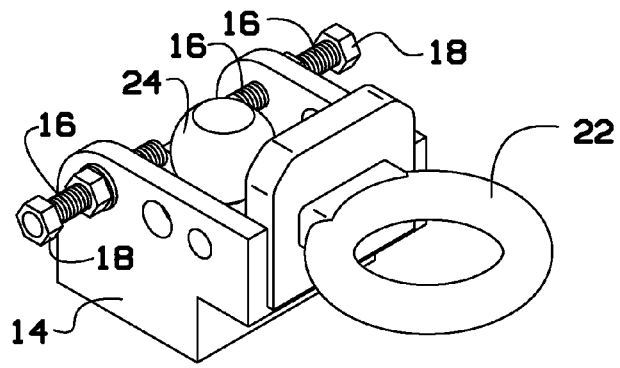

FIG. 4 is a forward perspective view of one embodiment of the invention.

Figure 5:
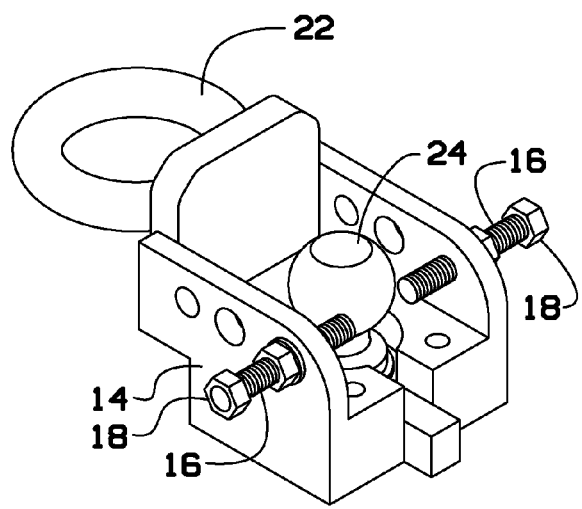

FIG. 5 is a rear perspective view of one embodiment of the invention.

Figure 6:
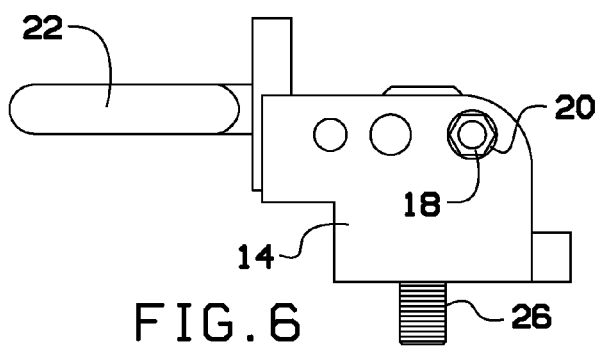

FIG. 6 is a side view of one embodiment of the invention.

Figure 7:
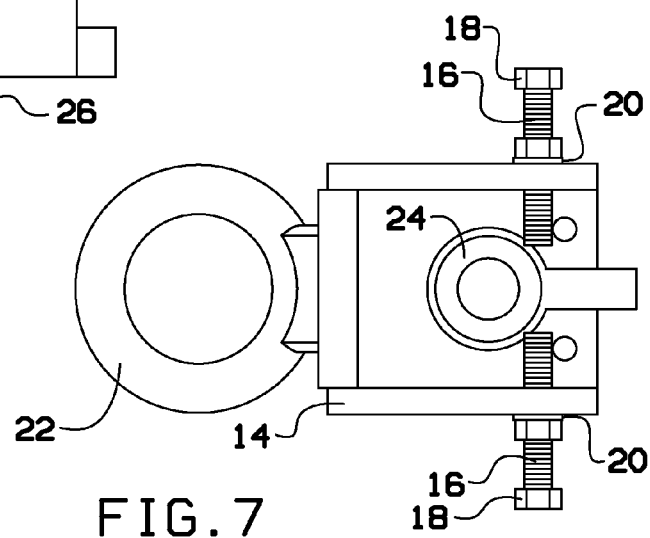

FIG. 7 is a top view of one embodiment of the invention.

Figure 8:
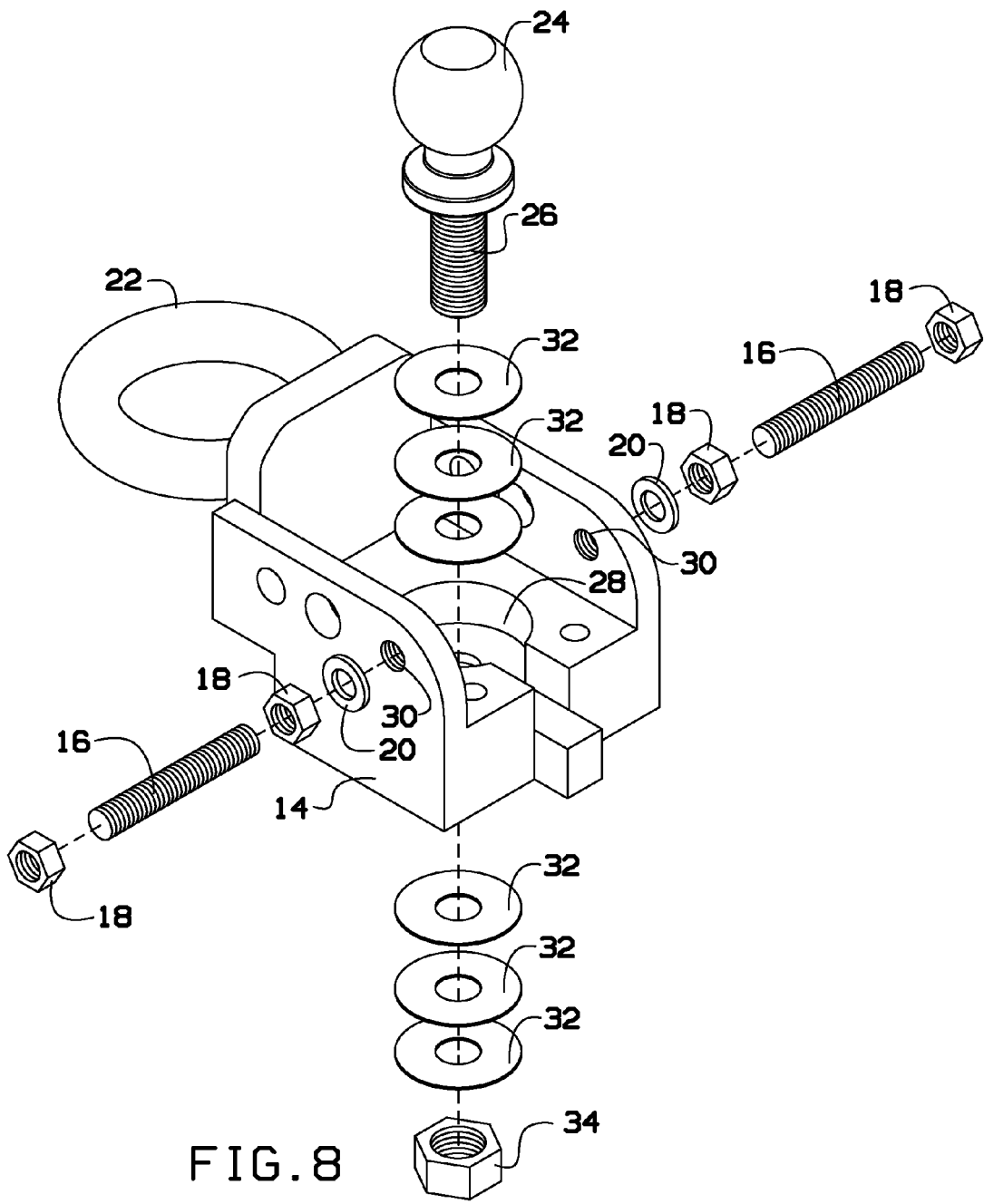

FIG. 8 is an exploded view of one embodiment of the invention.

DETAILED DESCRIPTION OF THE INVENTION

Embodiments of the present invention overcome many of the obstacles associated with hitch adapters, and now will be described more fully hereinafter with reference to the accompanying drawings that show some, but not all embodiments of the claimed invention. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows an embodiment of the invention in use. The embodiment of the invention relates to vehicles that pull a trailer. The vehicle is mechanically coupled to hook 12, in the preferred embodiment hook 12 is a pintel-hook style hook, but any kind of hook can work. The pintel-hook style hook allows for greater maneuverability of adapter ring 22. Hook 12 is immediately adjacent to adapter ring 22. Adapter 14 comprises adapter ring 22. Adapter 14 further comprises a size variable clamp. The size variable clamp is a feature not found in the prior art and can include a combination of springs, latches and screws that can accommodate a variety of ball couplers 24. The embodiment of the present invention has found utilizing right threaded rod 16 with right side nut 18 and right washer 20 along with utilizing left threaded rod 16 with left side nut 18 and left washer 20. This configuration is shown in more detail in FIG. 4, FIG. 5, FIG. 6 and FIG. 7. Ball coupler 10 can fit over height-adjustable ball 24, regardless of the size of ball coupler 10 affixed to the trailer. Height-adjustable ball 24 is also a feature not found in the prior art. In this manner, the hitch adapter allows any vehicle to be coupled to any ball coupler 10 regardless of the size of ball coupler 10, a unique feature of embodiments of the present invention.

FIG. 2 and FIG. 3 demonstrate two of the unique features of embodiments of the present invention: the ability to allow the trailer to go over bumps using the hitch adapter without causing damage to ball coupler 10 or hook 12. Embodiments of the present invention allow adapter ring 22 to rotate inside hook 12 as shown in FIG. 2 demonstrating full articulation in a vertical direction. The next unique feature is that embodiments of the present invention can allow substantially smaller turning radius by enabling adapter ring 22 to rotate around hook 12 as shown in FIG. 3 demonstrating full articulation in the rotational direction.

FIG. 4, FIG. 5, FIG. 6 and FIG. 7 show adapter body 14 in more detail. Adapter body 14 comprises adapter ring 22 mechanically coupled to a front plate. The front plate is mechanically coupled to a first parallel surface. The first parallel surface is mechanically coupled to a left plate and a right plate. Both the left plate and the right plate further comprise a plurality of cavities including a left cavity and a right cavity that can accommodate side threaded rod 16. This allows for placement of ball coupler 10 that can be held in place with side threaded rod 16 as indicated above. The first parallel surface comprises adopter ball inset 28 (as shown in FIG. 8) that can accommodate ball threaded stem 26 which is mechanically coupled to height-adjustable ball 24 as shown in more detail in FIG. 8.

FIG. 8 demonstrates another novel feature of an embodiment of the present invention washers 32 can be used to raise and lower a height of height-adjustable ball 24 from adapter ball insert 24. This makes height-adjustable ball 24 flush with ball coupler 10 removing horizontal articulation of ball coupler 10 and allowing unlimited vertical articulation when the trailer goes over a hill. This prevents misalignment from the embodiment of the invention and unnecessarily vibration further avoiding system damage. Extra washers can be stored on ball threaded stem 26 below adopter ball inset 28 held in place by ball threaded stem nut 34. This allows a user to take a first trailer to one location with a vehicle and then transfer the vehicle to a second trailer with the same hitch adapter, which can be quickly reconfigured for the second trailer by adjusting right threaded rod 16 with right side nut 18 and right washer 20 along with utilizing left threaded rod 16 with left side nut 18 and left washer 20 along with adding or removing washers 34 as needed.

The which is claimed:

1. An improved hitch adapter allows an individual to attach a vehicle with a hook to a trailer with a ball coupler, the improved hitch adapter comprising, an adapter ring mechanically coupled to a front plate; the front plate is mechanically coupled to a first parallel surface; the first parallel surface further comprises an adapter ball inset; the first parallel surface is mechanically coupled to a left plate and a right plate;

the adapter ball inset is mechanically coupled to a height-adjustable ball; the right plate and the left plate are mechanically coupled to a size variable clamp; this enables a user to mechanically couple the hook to the ball coupler regardless of size of the ball coupler enabling full articulation in a vertical direction and a rotational direction; and the size variable clamp comprises a right threaded rod installed through a right cavity in the with a right side nut and a right washer along with a left threaded rod installed through a left cavity with a left side nut and a left washer to hold the ball coupler in place and allow for rapid transition of the vehicle from a first trailer to a second trailer.

2. The improved hitch adapter of claim 1, the height-adjustable ball is further mechanically coupled to a ball threaded stem, such that a height of the height-adjustable ball relative to the adapter ball inset can be adjusted by inserting washers on the ball threaded stem allowing for rapid transition of the vehicle from a first trailer to a second trailer.

3. The improved hitch adapter of claim 1, the hook is a pintel-hook style hook which provides greater maneuverability of the adapter ring.

\* \* \* \* \*